United States Patent
Rapson et al.

(10) Patent No.: US 11,157,249 B1
(45) Date of Patent: Oct. 26, 2021

(54) METHOD AND SYSTEM FOR IDENTIFYING AND EXTRACTING INDEPENDENT SERVICES FROM A COMPUTER PROGRAM

(71) Applicant: vFunction, Inc., Menlo Park, CA (US)

(72) Inventors: Amir Rapson, Shoham (IL); Uri Simchoni, Kfar Yehezkel (IL); Ori Saporta, Givatayim (IL)

(73) Assignee: Vfunction, Inc., Menlo Park, CA (US)

( * ) Notice: Subject to any disclaimer, the term of this patent is extended or adjusted under 35 U.S.C. 154(b) by 0 days.

(21) Appl. No.: 16/995,189

(22) Filed: Aug. 17, 2020

(51) Int. Cl.
  *G06F 9/44* (2018.01)
  *G06F 8/41* (2018.01)

(52) U.S. Cl.
  CPC .................. *G06F 8/433* (2013.01)

(58) Field of Classification Search
  None
  See application file for complete search history.

(56) References Cited

U.S. PATENT DOCUMENTS

| 7,222,341 B2 * | 5/2007 | Forbes .................. G06F 8/61 717/169 |
| 8,930,884 B2 * | 1/2015 | Joukov .............. G06F 11/3692 717/101 |
| 2004/0079529 A1 | 4/2004 | Bartlett |
| 2011/0131191 A1 * | 6/2011 | Szyperski .............. G06F 9/542 707/702 |

* cited by examiner

*Primary Examiner* — Anna C Deng
(74) *Attorney, Agent, or Firm* — M&B IP Analysts, LLC

(57) ABSTRACT

A method and system for identifying and extracting independent services from a computer program are configured. The method comprises retrieving code and runtime data of the computer program, upon reception of a request to extract at least one service; performing a dynamic analysis on the retrieved code to determine code resources of the computer program; identifying, based on the code resources and runtime data, boundaries of services included in the computer program and are independent of other services; and deriving context and compile-time dependencies of the computer program using static analysis; and generating based on the context, compile-time dependencies, and code resources a service specification file for each independent service of the services included in the computer program, wherein an independent service includes all resources require for its execution independently of the computer program.

17 Claims, 7 Drawing Sheets

```
{
  "beans": [
    {
      "file_name": "sqlmaps/shipping.xml",
      "content": "PD94bWwgdmVyc2lvbj0iMS4wIiBlbmNvZGluZz0iVVRGLTgiID8+FwcGVyPg=="
    }
  ],
  "classes": [
    "com.oms.controller.ModifyFulfillmentController",
    "com.oms.dto.AuthorizationRequestDto",
    "com.oms.dto.AuthorizationResponseDto",
    "com.oms.dto.EmailRequestDto",
    "com.oms.entity.BillToAddress",
    "com.oms.entity.Charges",
    "com.oms.entity.LineCharges",
    "com.oms.entity.OrderLine",
    "com.oms.entity.PaymentInfo",
    "com.oms.entity.SalesOrder",
    "com.oms.entity.ShipToAddress",
    "com.oms.entity.Shipping",
    "com.oms.repository.SalesOrderRepository",
    "com.oms.service.ModifyFulfillmentService"
  ],
  "jars": [
    "jackson-annotations-2.10.0.jar",
    "jakarta.persistence-api-2.2.3.jar",
    "spring-beans-5.2.1.RELEASE.jar",
    "spring-boot-autoconfigure-2.2.1.RELEASE.jar",
    "spring-context-5.2.1.RELEASE.jar",
    "spring-core-5.2.1.RELEASE.jar",
    "spring-data-jpa-2.2.1.RELEASE.jar",
    "spring-web-5.2.1.RELEASE.jar"
  ],
  "partials": [
    {
      "name": "com.oms.OmsApplication_vf_1",
      "class_bytes": "LyoKICogRGVjb21waWxlZCB3aXRoIENGUiAwLjE0OS4KICovCnBhY2thZ2UgY29tLm9tczsKCmltcG9ydCBvcmcuc3ByaW5nZnJhbWV3b3JrLmJvb3QuU3ByaW5nQXBwbGljYXRpb247CmltcG9ydCBvcmcuc3ByaW5nZnJhbWV3b3JrLmJvb3QuYXV0b2NvbmZpZ3VyZS5FbmFibGVdXRvQ29uZmlndXJhdGlvbjsKaW1wb3J0IG9yZy5zcHJpbmcmcmFtZXdvcmsuY29udGV4dC5hbm5vdGF0aW9uLkNvbmZpZ3VyYXRpb247CgpAU3ByaW5nQm9vdEFwcGxpY2F0aW9uQ29udGV4dCA9IFNwcmluZ0FwcGxpY2F0aW9uLnJ1bihPbXNcHBsaWNhdGlvbi5jbGFzcywgKEN0cmluZ1tdKWFyZ3NcmluZyk7CiAgICB9Cn0K"
    }
  ]
}
```

FIG. 2

METHOD AND SYSTEM FOR IDENTIFYING AND EXTRACTING INDEPENDENT SERVICES FROM A COMPUTER PROGRAM

TECHNICAL FIELD

The present disclosure relates generally to software computer programs and, more particularly, to identifying and extracting independent functionality from computer programs.

BACKGROUND

Software applications and computer programs are large and complex. A large computer program includes a large number of code lines, as well as other program components, such as classes, libraries, and the like. The complexity of a computer program results from dependencies between program components, dependencies on internal resources, and dependencies on external resources. As such, not all services or functions in a computer program may be developed, deployed, and executed independently of each other. However, today, in modern distributed computing environments: engineering velocity, development agility, scalability or performance advantages, may be gained by developing, deploying and executing some services independently. For example, a service that requires frequent modifications or updates may be developed and deployed separately by a dedicated team, thereby reducing the development and testing cycle. From a performance perspective, a high-demand service may be allocated with more computing resources, such as CPU and memory, to improve such services.

As such, many organizations attempt to modernize their applications, so to be able to support rapid changes in such applications and to enable execution over modern distributed computing environments (e.g., cloud). A key step in modernizing software applications is to identify and extract independent services or functions from already deployed applications.

Due to the complexity and size of a computer program, identifying independent services, and extracting the same cannot be performed efficiently using existing solutions. Identifying such services through manual code inspection is imprecise and impractical.

Existing solutions are limited to detecting dependencies among various code resources or dependencies to external resources, such as libraries outside of the program.

However, detecting dependencies is not enough to identify and extract services. Specifically, in addition to dependencies, boundaries, compile-time resources, and the context of the computer program, are also required to identify and extract independent services. Context can be non-code resources that affect the behavior of the computer program, such as configuration files, environment variables, properties, and the like. The context may also include code resources that are injected into the computer program to create run-time dependencies. Such code resources are crucial to run an extracted independent service without any errors.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for identifying and extracting independent services from a computer program. The method comprises retrieving code and runtime data of the computer program, upon reception of a request to extract at least one service; performing a dynamic analysis on the retrieved code to determine code resources of the computer program; identifying, based on the code resources and runtime data, boundaries of services included in the computer program and are independent of other services; deriving context and compile-time dependencies of the computer program using static analysis; and generating based on the context, compile-time dependencies, and code resources a service specification file for each independent service of the services included in the computer program, wherein an independent service includes all resources require for its execution independently of the computer program.

In addition, certain embodiments disclosed herein include a system for identifying and extracting independent services from a computer program. The system comprises a processing circuitry; and a memory, the memory containing instructions that, when executed by the processing circuitry, configure the system to: retrieving code and runtime data of the computer program, upon reception of a request to extract at least one service; performing a dynamic analysis on the retrieved code to determine code resources of the computer program; identifying, based on the code resources and runtime data, boundaries of services included in the computer program and are independent of other services; and deriving context and compile-time dependencies of the computer program using a static analysis; and generating based on the context, compile-time dependencies, and code resources a service specification file for each independent service of the services included in the computer program, wherein an independent service includes all resources require for its execution independently of the computer program.

In addition, certain embodiments disclosed herein include a method for modernizing a computer program. The method comprises analyzing code of the computer program to identifying at least one independent service included in the computer program; extracting each of the least one identified independent service from in the computer program, wherein an extracted independent service includes all resources require for its execution independently of the computer program; and compiling and deploying each of the extracted independent service to any computing platform.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 2 is an example service specification file generated, according to an embodiment.

DETAILED DESCRIPTION

Figure 1:
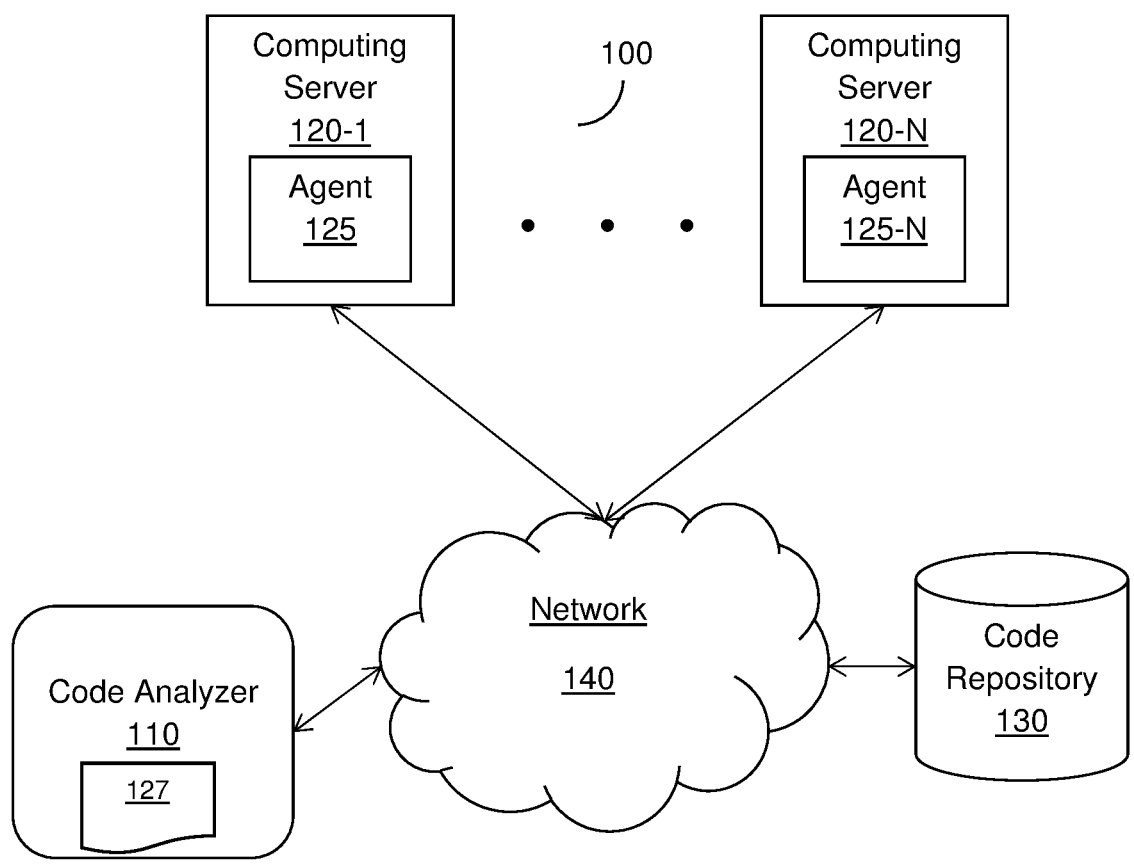
FIG. 1 is a network diagram depicting a network system utilized to disclose the embodiments for identifying and extracting services from a computer program.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Some example embodiments allow for modernizing a computer program, to enable execution of services defined therein on a distributed computing platform, such as but not limited to, a cloud computing platform. In an embodiment, a method for modernizing a computer program includes analyzing code of the computer program to identify independent services included in the computer program, extracting identified independent services from in the computer program, and compiling and deploying each of the extracted independent service in a distributed computing platform. An extracted independent service includes all resources required for its execution independently of the computer program. In an embodiment, the identification and extraction of an independent service requires at least deriving the context of the computer program using a static analysis. The various embodiments will be now discussed in greater detail.

FIG. 1 is an example network diagram depicting a network system 100 utilized to disclose the embodiments for identifying and extracting services from a computer program. The system 100 includes and a code analyzer 110, one or more computing servers, 120-1 through 120-N (hereinafter "computing servers" 120 or "computing server" 120), and a code repository 130. Further, in the system 100, the various components listed are interconnected via a network 140.

The network 140 provides interconnectivity between the various components of the system. The network 140 may be, but is not limited to, a wireless, cellular, or wired network, a local area network (LAN), a wide area network (WAN), a metro area network (MAN), the Internet, the worldwide web (WWW), similar networks, and any combination thereof. The network may be a full-physical network, including exclusively physical hardware, a fully-virtual network, including only simulated or otherwise-virtualized components, or a hybrid physical-virtual network, including both physical and virtualized components. Further, the network 140 may be configured to encrypt data, both at rest and in motion, and to transmit encrypted, unencrypted, or partially-encrypted data. Further, the network 140 may be configured to connect with the various components of the system 100 via any combination of wired and wireless means.

The computing servers 120 may include any type of computing resource configured to execute computer programs. A computer program may include a software application, a web application, a cloud application, a legacy software application, a process, a function, and the like, coded or programmed using a programming language such as may be programmed or coded using Java®, .NET, C++, and the like, or a scripting language, such as, as an example, Python.

A computing server 120 may be a physical machine or virtual machine. That is, a computing server 120 may execute a computer program in a virtual environment, such as a virtual machine, a software container, or a serverless infrastructure. The computing server 120 may include, without limitation, a web server, an application server, a database server, and the like.

A computer program is typically written in serial form. Such instructions may include methods, functions, or services, referred to as "services" or "a service," which perform a specific task for the computer program. During execution of a computer program, each line of code, function, or both may typically be executed line-by-line in sequence. It should be noted that two or more servers 120 can execute the same instance or different instances of a computer program.

In an embodiment, each computing server 120 executing a computer program to be analyzed by the code analyzer 110 includes an agent 125 installed in the respective server 120. An agent 125 is a persistent piece of code installed and executed in a server 120. An agent 125, when executed by the server 120, is configured to retrieve code as well as runtime data of any computer program executed by the respective server 120 and provides such code to the analyzer 110. In another embodiment, the retrieved code may be stored in the repository 130. The retrieved code may include, for example, binary code, readable source code, assembly code, byte code, or any other code level, such as, for example, Java bytecode or .NET CIL code.

The code analyzer 110, depicted in detail with respect to FIG. 7, below, is a system configured to execute instructions, organize information, and otherwise process data. The code analyzer 110 is configured to execute the methods and processes described hereinbelow, other, like, methods, and any combination thereof. Specifically, the code analyzer 110 is configured to analyze the code of a computer program, identify services, determine which of the identified services can be executed independently, extract such services, and provide a complete service specification file for each independent service. The specification file includes the code of the service and resources required for compilation and execution of such service.

By way of non-limiting example, the operation of the code analyzer 110 will be discussed with reference to analyzing the computer program 127 executed over the computing server 120-1. The code of the program 127 is provided to the analyzer 110 by the agent 125 in the server 120. The code of the program 127 includes functions, classes, and methods, of one or more independent service. An independent service is a service or function that is part of the computer program 127, but can be extracted and executed independently of the computer program 127.

According to the disclosed embodiment, the code analyzer 110 is configured to perform dynamic analysis on the data collected from a running application. The dynamic analysis identifies dependencies in the program's code and may similarly identify dependencies between objects and classes as well as function calls in the computer program 127. An example for the dynamic analysis process is described in a U.S. patent application Ser. No. 16/872,977, assigned to the common assignee, which is hereby incorporated by reference for all it contains. In an embodiment, the code analyzer 110 receives the dependencies from a system configured to perform the dynamic analysis.

In another embodiment, information from the dynamic analysis is used to identify boundaries of each service in the program's code. The boundaries include a start entry-point for a service and may include end entry-point to at least one different service. The start and end entry points are maintained in a "stop list".

The code analyzer 110 is further configured to analyze a global configuration of the program 127 to determine which code resources should not be analyzed (hereinafter, the "filter"). For example, common infrastructure libraries are generally ignored. The filter and stop list are marked as the "stop conditions".

The code analyzer 110 is configured to run a process, discussed in detail below, to determine the context of the program 127. The context may include non-code resources that affect the behavior of the computer program, such as configuration files, environment variables, properties, and the like.

Subsequently, the code analyzer 110 is configured to perform static analysis to identify configuration resources that are required only at runtime for the service to run independently of the program 127.

Finally, the code analyzer 110 is configured to generate and output a specification file for each extracted independent service. The specification file is a complete list of resources, such as classes, methods, functions, configuration data, and the like, in their entirety, or as partial sets of the original resources, as well as libraries which are required for the extracted service to successfully compile and run.

An example service specification file generated according to the disclosed embodiment is provided in FIG. 2. As demonstrated in FIG. 2, the service specification file may include a reference to classes, libraries, or both, and their respective code or configuration files.

When the specification file of a service is ready, a user may elect to compile and run the service on any server 120. The specification can be stored in the code repository 130. In an embodiment, the extracted service can be deployed as a microservice or a serverless function.

It should be noted that the code analyzer 130 may be deployed in on-premise configurations where the computing servers 120 are deployed. Alternatively, the code analyzer 110 may be deployed in a cloud computing platform. Other deployment options are also feasible. FIG. 2 is an example service specification file generated, according to an embodiment.

Figure 3:
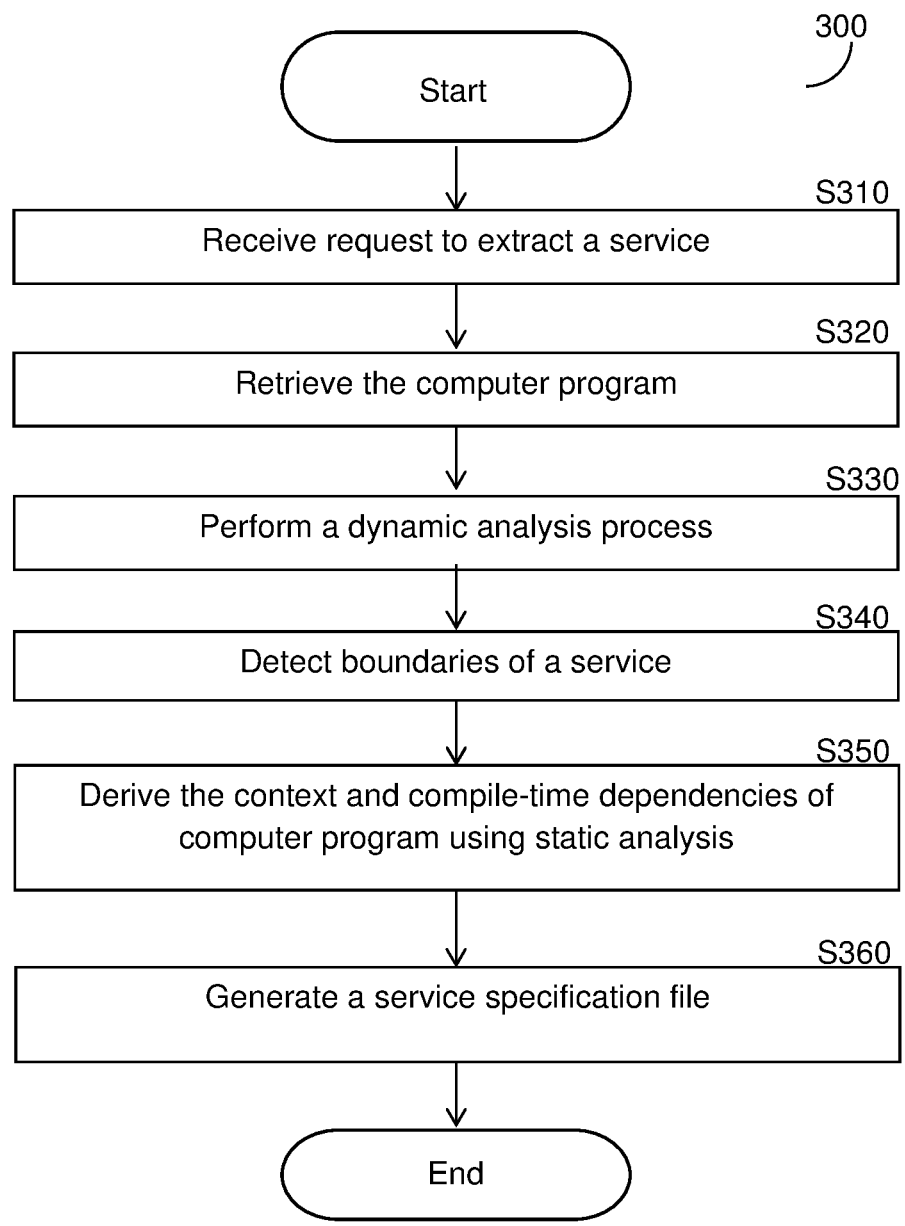
FIG. 3 is a flowchart illustrating a method for creating independent services of a computer program, according to an embodiment.

FIG. 3 is an example flowchart 300 illustrating a method for creating independent services of a computer program, according to an embodiment.

At S310, the method starts upon receiving a request from a user to create, that is, identify and extract, at least one service from a computer program. The service to be created is an independent service, as discussed above.

At S320, the code and runtime data of the computer program identified in the request is retrieved, either from a server running the computer program or from a code repository. In an embodiment, these are retrieved from the server using an agent installed therein.

At S330, a dynamic analysis process to determine code resources of the computer program is performed. The dynamic analysis outputs references to code resources, including, without limitation, functions, classes, and methods, and their dependencies. The output of the dynamic analysis may also include mapping dependencies between objects, or entities, and classes, as well as function calls in the computer program. An embodiment for performing the dynamic analysis process is discussed in the above-referenced patent application.

Alternatively, the dynamic analysis data may be retrieved from a repository, such as the code repository 130, FIG. 1. Such data is stored after execution of the dynamic analysis independently of the service creation method.

At S340, an analysis is performed to detect boundaries of a service. The analysis is performed based on the dynamic analysis data. In an embodiment, the analysis also attempts to detect a service that does not include dependencies to other services. The analysis may be based on machine learning algorithm or data science or graph-theory algorithms designed to determine, for example, syntax that implies a boundary of a service. The output of the boundaries' analysis is the stop list that includes start and end entry-points for each identified service. In some embodiments, the stop list may include only a start entry-point of a service.

At S350, the context and compile-time dependencies of the computer program is derived using a static analysis. The context includes non-code resources that affect the behavior of the computer program, such as configuration files, environment variables, properties, and the like. The configuration files are required only at runtime for the service to run as before (i.e., as being part of the original application).

In an embodiment, S350 includes analyzing the compile-time dependencies of the received code, and from the received code and its dependencies to detect references of configuration resources or files, such as XML, JSON, YAML, and the like, their properties, and the like, and the elements the configuration files are composed of in any resource. Such resource may include, without limitation, code or another configuration file. Subsequently, a minimal set of the analyzed elements that correspond with a service is identified.

The compile-time dependencies include code resources that inject into the computer program without being a static dependency or dependencies. The compile-time dependencies are injected using frameworks, such as Spring, employing methods of inversion of control (IoC) and dependency injection (DI). The process for detecting such dependencies is discussed below. It should be noted that the context of detected dependencies is also detected.

The context compile-time dependencies can be derived based on static analysis, based on processing the dynamic analysis data, the stop list, and the filter. The static analysis is performed code resources derived from binary code, high-level code of the computer program. A filter defines code resources that should not be analyzed, and can be derived from the global configuration of the computer program. S350 further includes expanding the list of entities with their direct compile-time dependencies and the libraries that contain them, emulating any dependency injection behavior associated with the code resources identified up to that point. This allows for identification of code and non-code resources that were not observed before. The operation of S350 is described in further detail with reference to FIG.

4, below. The output of S350 includes at least a complete list of code resources, static dependencies, compile-time dependencies, and libraries included in the computer program and are required by the extracted service to successfully compile and run.

At S360, based on the output of the S350, a service specification file is generated and output. The specification file includes all code resources, libraries, and configuration files required to compile, package, and run the extracted service as intended. Any item included in the specification file may be in a minimized or partial form. For example, the specification file may include a URI or other pointer to a location of a library or a configuration file and not their respective contents.

In an embodiment, the specification file is provided to a code-copying tool, which can create a compliable project based on the source files, libraries, and resources of the input computer program. When the project file is ready, a user can compile such a project to create the service executable.

In a further embodiment, a user can review the specification file and redefine or change the start and end entry-points of the service. In such a case, upon any change, a new specification file is generated by executing S330 to S350.

It should be noted that the method discussed herein with reference to FIG. 3 may be performed for each service in an input computer program. It should be further noted that the method described herein can utilized for modernization of computer programs by providing services or microservices that can be independently executed on a modern distributed computing platform, e.g., a cloud platform.

Figure 4:
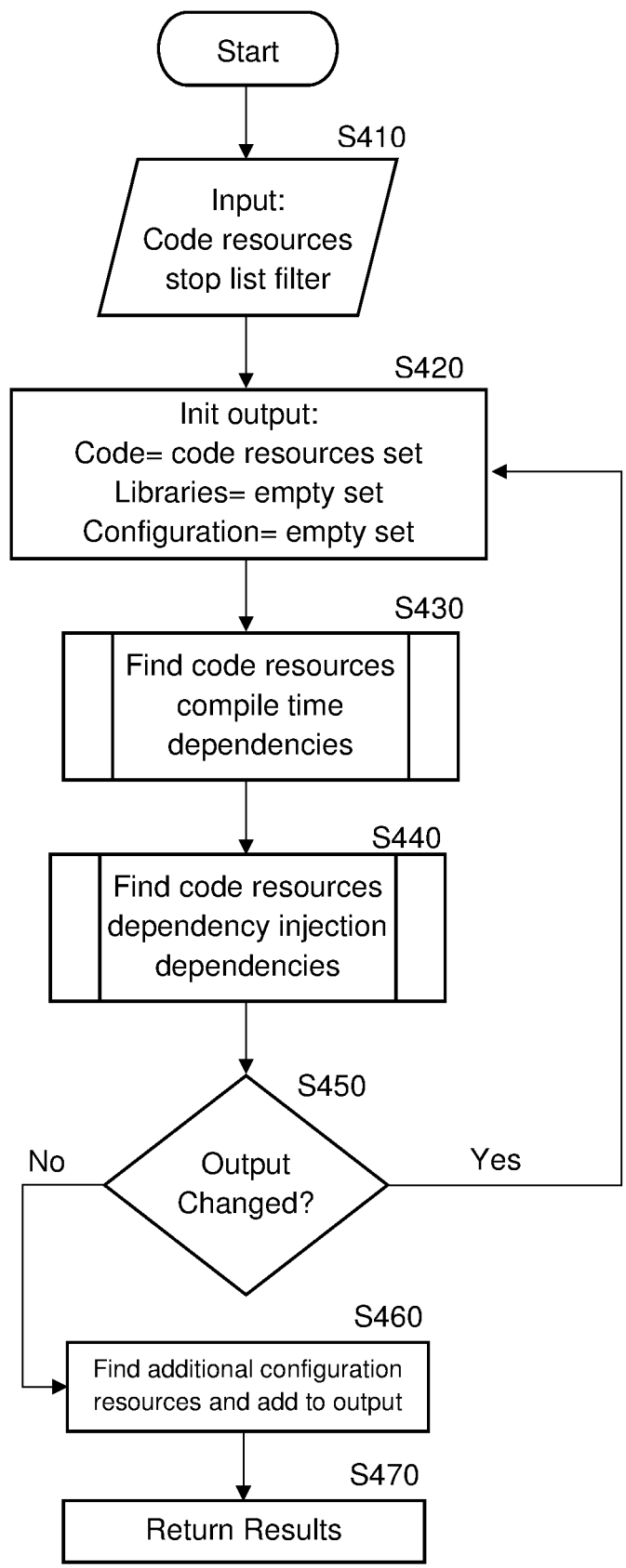
FIG. 4 is a flowchart illustrating a method for deriving the context of a service, according to an embodiment.

FIG. 4 is an example flowchart S350 describing the process for deriving the context of a service according to an embodiment.

At S410, the dynamic analysis data, the stop list, and the filter are received. The source and the generation of each dynamic analysis data, the stop list, and the filter are mentioned above.

At S420, the data structures utilized to hold code resources, configuration resources, and libraries, determined by the process, are initialized.

Figure 5:
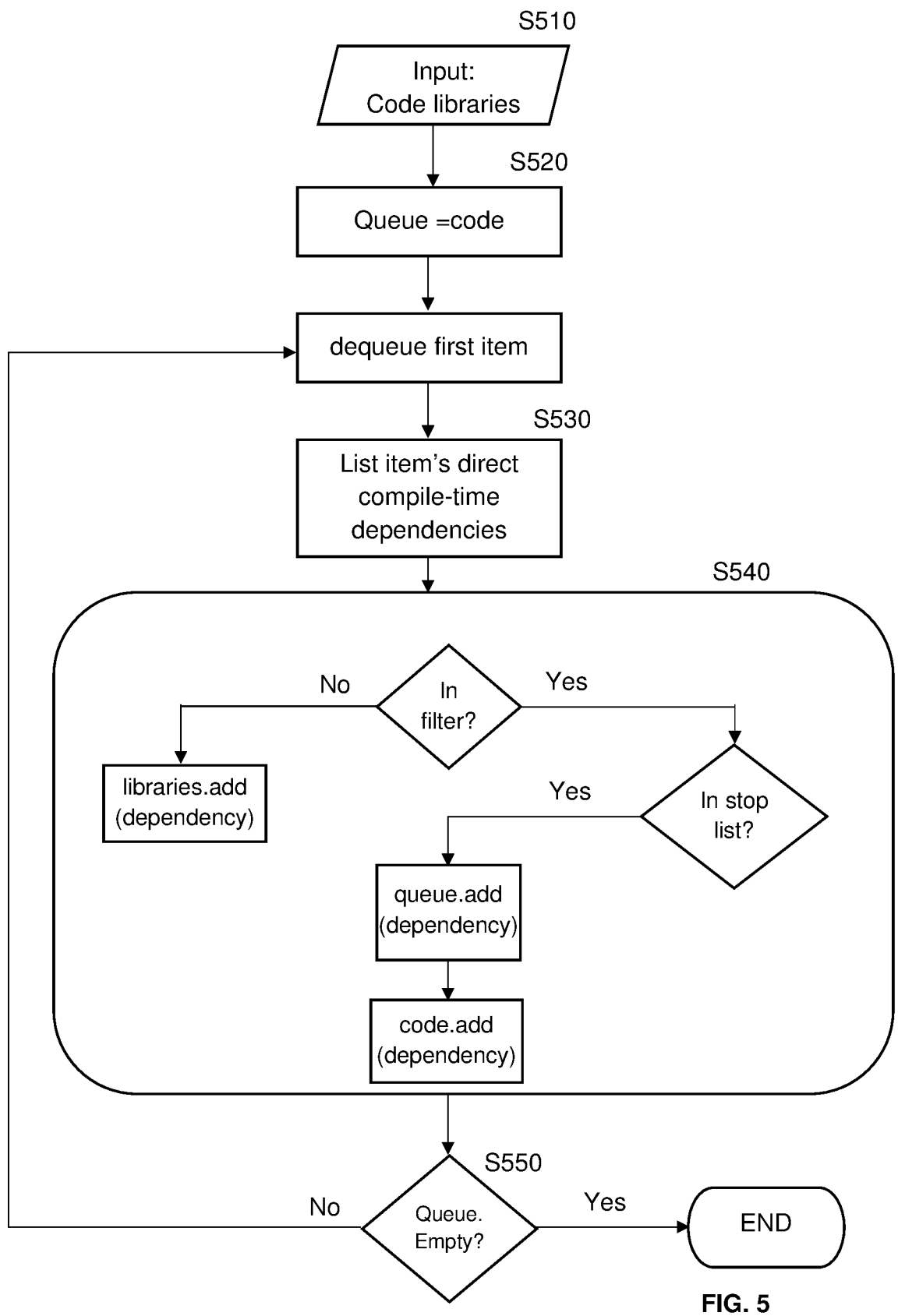
FIG. 5 is a flowchart illustrating a method for detecting compile-time dependencies, according to an embodiment.

At S430, a list of compile-time dependencies is detected by analyzing the input data received at S410. The operation of S430 is described with respect to FIG. 5, below.

At S510, the code and library data structures, set at S420, are accessed. At S520, an internal queue with the code resources in the code data structure is initialized. At S530, for each code resource in the queue, its list of direct compile-time dependencies is generated. Direct compile time dependencies are other code resources referenced in the code of the current code resource.

At S540, each of the compile-time dependencies listed in the generated list it is checked to determine whether the dependency belongs to a service. This is performed by checking if the dependency is included in the filter and within the service boundaries indicated by the stop list. A dependency that belongs in the service is added to the queue and to the code resources data structure. It should be noted that a resource can only be added to the queue once per run, thus ensuring that no loops are made, and that the process will eventually converge. Resources that belong to another service are ignored. Resources that do not match the filter are added to the library data structure.

At S550, it is checked if the queue is empty, and if not, execution returns to S530, until all items in the queue are being processed.

Figure 6:
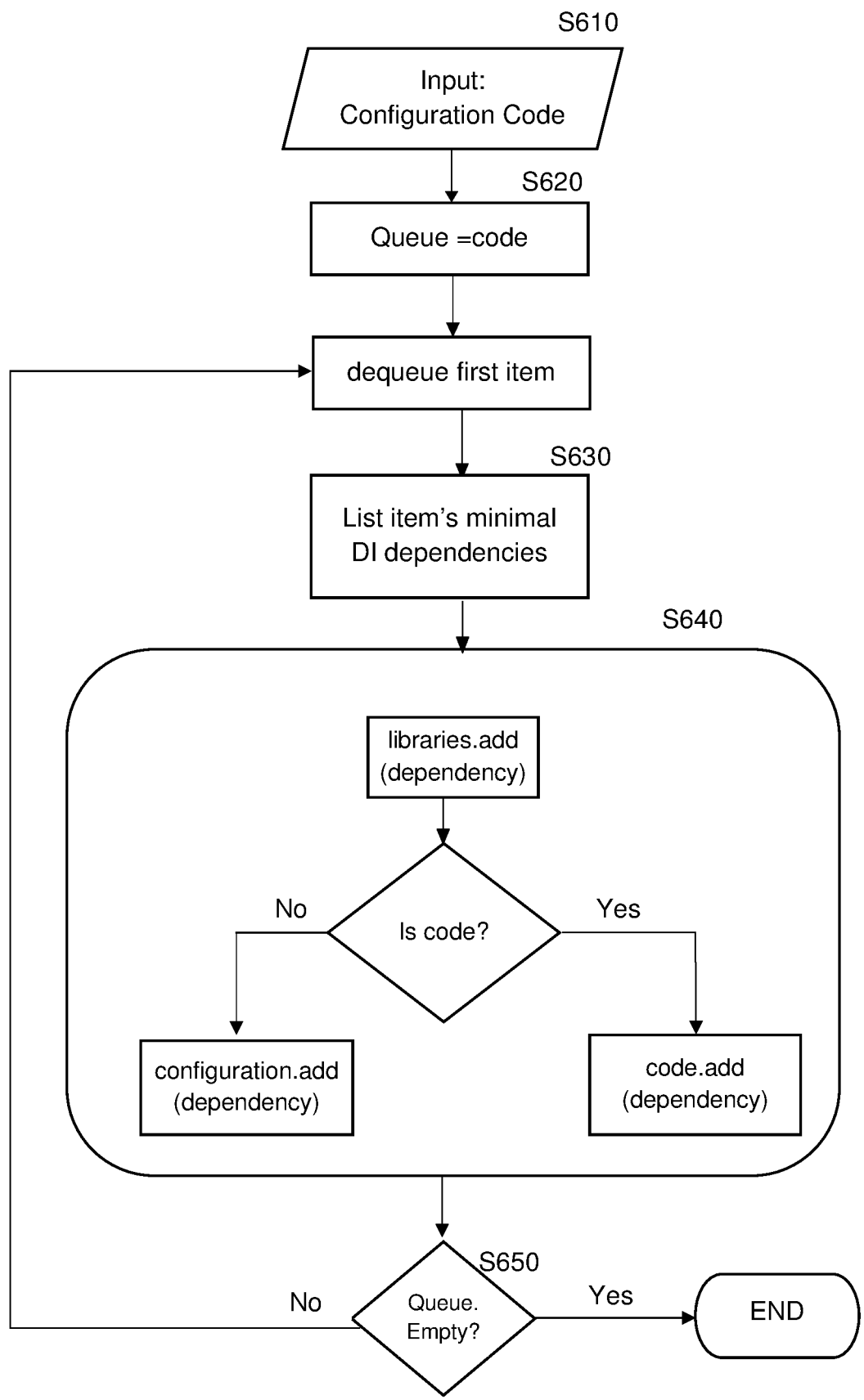
FIG. 6 is a flowchart illustrating a method for detecting dependencies added through dependency injection mechanisms, according to an embodiment.

Returning now to FIG. 4, where, at S440, dependency injection behavior associated with the code resources is emulated to identify additional dependencies. The emulation of such dependencies can be performed using methods, such as inversion of control (IoC) and dependency injection (DI), and the like. The operation of S440 is further described in detail with respect to FIG. 6.

At S610, the code and library data structures, set at S420, are accessed. At S620, an internal emulation queue with the code resources in the code data structure is initialized. At S630, for each code resource in the queue, through emulation, DI dependencies are listed. Each such dependency may include code resource or configuration resource. In an embodiment, each listed DI dependency is minimized, which may produce a partial resource containing only the parts of the resource that are relevant to the current code resource.

At S640, each of the DI dependencies listed in the generated list is added to the emulation queue and its relevant code for any detected dependency is added to the code data structure. It should be noted that a DI dependency can only be added to the queue once per run, thus ensuring that no loops are made, and that the process will eventually converge. Different versions of the same DI dependency are merged.

At S650, it is checked whether the queue is empty and, if not, execution returns to S630 until all code resources in the queue are being processed.

Returning now to FIG. 4, where, at S450, it is checked whether the data structures have been changed, relative to the last check or their initial state. If so, execution returns to S420, otherwise, execution continues with S460, where the additional configuration resources of the service, excluding dependencies, of the service are identified.

At S470, the complete context of the service, as identified at S430, S440, and S460, is saved, including, without limitation, in a file, and returned.

Figure 7:
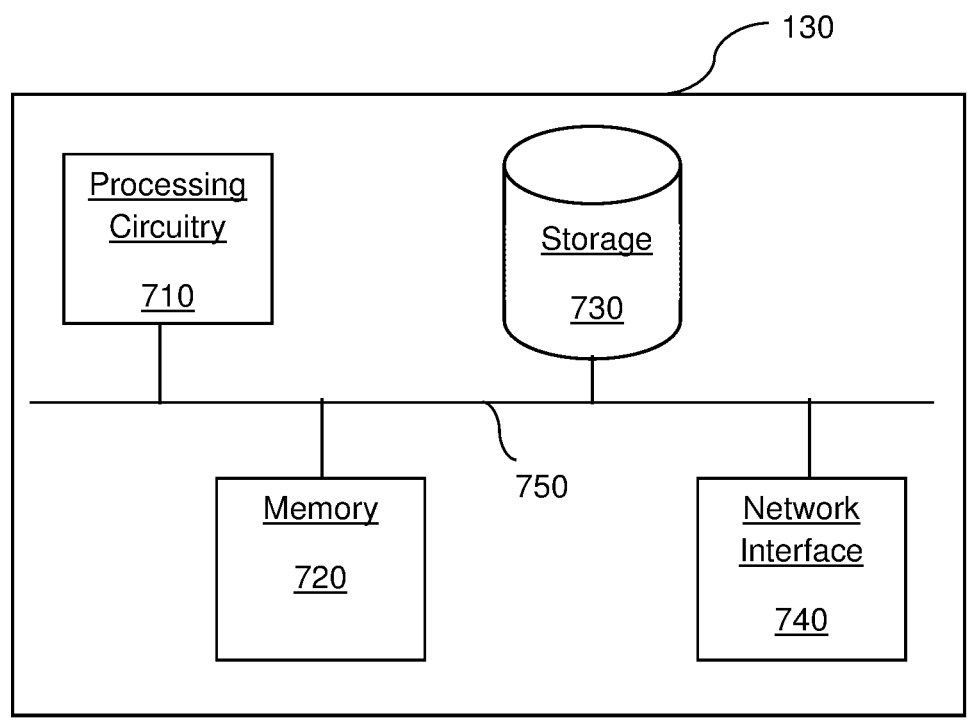
FIG. 7 is a block diagram of a code analyzer according to an embodiment.

FIG. 7 is an example schematic diagram of the code analyzer 110, according to an embodiment. The code analyzer 130 includes a processing circuitry 710 coupled to a memory 720, a storage 730, and a network interface 740. In an embodiment, the components of the code analyzer 110, may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 720 may be volatile (e.g., random access memory, etc.), non-volatile (e.g., read only memory, flash memory, etc.), or a combination thereof.

In one configuration, software for implementing one or more embodiments disclosed herein may be stored in the storage 730. In another configuration, the memory 720 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 710, cause the processing circuitry 710 to perform the various processes described herein.

The storage 730 may be magnetic storage, optical storage, and the like, and may be realized, for example, as flash memory or another memory technology, compact disk-read only memory (CD-ROM), Digital Versatile Disks (DVDs), or any other medium which can be used to store the desired information.

The network interface 740 allows the analyzer 110, to communicate with the various servers (e.g., servers 120), a user device, or both for requesting service creation and providing additional input.

It should be understood that the embodiments described herein are not limited to the specific architecture illustrated in FIG. 7, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for identifying and extracting independent services from a computer program, comprising:
   retrieving, by a processing circuitry, code and runtime data of the computer program, upon reception of a request to extract at least one service;
   performing, by the processing circuitry, a dynamic analysis on the retrieved code to determine code resources of the computer program;
   identifying, by the processing circuitry, based on the code resources and the runtime data, boundaries of each service of services included in the computer program and are independent of other services, wherein identifying the boundaries of each service of the services comprises generating a stop list, the stop list includes for each identified service at least a start entry-point of the identified service;
   deriving, by the processing circuitry, context and compile-time dependencies of the computer program using static analysis, wherein deriving the context and the compile-time dependencies of the computer program comprises iteratively detecting compile-time dependencies in the code resources; and
   generating, by the processing circuitry based on the context, the compile-time dependencies, and the code resources, a service specification file for each independent service of the services included in the computer program, wherein an independent service includes all resources require for its execution independently of the computer program.

2. The method of claim 1, further comprising:
   for the each independent service of the services:
   creating, based on the service specification file, a respective independent service;
   compiling the respective independent service; and
   deploying the respective independent service on a computing platform.

3. The method of claim 1, wherein performing the dynamic analysis further comprises:
   mapping dependencies among the code resources.

4. The method of claim 3, wherein a code resource of the code resources includes any one of: an object, an entity, a class, a function call included in the code of the computer program.

5. The method of claim 1, wherein the context includes non-code resources affecting behavior of the computer program.

6. The method of claim 1, wherein deriving context and compile-time dependencies of the computer program further comprises:
   iteratively emulating dependency injections methods associated with the code resources to identify additional dependencies; and
   identifying configuration resources associated with computer program, wherein the configuration resources do not include dependencies.

7. The method of claim 1, wherein iteratively detecting the compile-time dependencies further comprises:
   initializing a queue with a list of direct compile-time dependencies for each code resource of the code resources;

iteratively, for each listed direct compile-time dependency, determining whether the compile-time dependency belongs to a service based at least on boundaries detected for the service; and adding the determined compile-time dependency belonging to the service to a data structure maintaining code resources of the service.

8. The method of claim 1, wherein iteratively additional dependencies further comprises:

initializing a queue with the code resources;

iteratively, for each queued code resource of the code resources, emulating a dependency for each of injection dependencies; and adding the emulated dependency with its associated code resource to a data structure maintaining code resources of a service.

9. A non-transitory computer readable medium having stored thereon instructions for causing the processing circuitry to execute the method of claim 1.

10. A system for identifying and extracting independent services from a computer program, comprising:

a processing circuitry; and a memory, the memory containing instructions that, when executed by the processing circuitry, configure the system to perform:

retrieving code and runtime data of the computer program, upon reception of a request to extract at least one service;

performing a dynamic analysis on the retrieved code to determine code resources of the computer program;

identifying, based on the code resources and runtime data, boundaries of each service of services included in the computer program and are independent of other services, wherein identifying the boundaries of each service of the services comprises generating a stop list, the stop list includes for each identified service at least a start entry-point of the identified service; and deriving context and compile-time dependencies of the computer program using a static analysis, wherein deriving context and compile-time dependencies of the computer program comprises iteratively detecting compile-time dependencies in the code resources; and generating based on the context, the compile-time dependencies, and the code resources, a service specification file for each independent service of the services included in the computer program, wherein an independent service includes all resources require for its execution independently of the computer program.

11. The system of claim 10, wherein the system is further configured to:

For the each independent of the services service of the services:

create, based on the service specification file, a respective independent service;

compile the respective independent service; and deploy the respective independent service on a computing platform.

12. The system of claim 10, wherein the system is further configured to: map dependencies among the code resources.

13. The system of claim 12, wherein a code resource of the code resources includes any one of: an object, an entity, a class, a function call included in the code of the computer program.

14. The system of claim 10, wherein the context includes non-code resources affecting behavior of the computer program.

15. The system of claim 10, wherein the system is further configured to:

iteratively emulate dependency injections methods associated with the code resources to identifying additional dependencies; and identify configuration resources associated with computer program, wherein the configuration resources do not include dependencies.

16. The system of claim 10, wherein the system is further configured to:

initialize a queue with a list of direct compile-time dependencies for each code resource of the code resources;

iteratively, for each listed direct compile-time dependency, determining whether the compile-time dependency belongs to a service based at least on boundaries detected for the service; and add the determined compile-time dependency belonging to the service to a data structure maintaining code resources of the service.

17. The system of claim 10, wherein the system is further configured to:

initialize a queue with the code resources;

iteratively, for each queued code resource of the code resources, emulating a dependency for each of injection dependencies; and add the emulated dependency with its associated code resource to a data structure maintaining code resources of a service.

* * * * *